US007185855B2

(12) United States Patent
Peck

(10) Patent No.: US 7,185,855 B2
(45) Date of Patent: Mar. 6, 2007

(54) METHOD AND SYSTEM FOR STEERING A MOMENTUM CONTROL SYSTEM

(75) Inventor: Mason A. Peck, Scottsdale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 131 days.

(21) Appl. No.: 10/836,986

(22) Filed: Apr. 30, 2004

(65) Prior Publication Data

US 2005/0242241 A1    Nov. 3, 2005

(51) Int. Cl.
B64G 1/38    (2006.01)
B64G 1/28    (2006.01)
(52) U.S. Cl. .......................... 244/165; 74/5.34
(58) Field of Classification Search ............ 74/5.7, 74/5.34, 5.37; 244/165
See application file for complete search history.

(56) References Cited

U.S. PATENT DOCUMENTS 2,371,368 A * 3/1945 Wallace ................... 180/8.1
3,238,793 A * 3/1966 Riordan et al. ............ 74/5.34
4,071,211 A   1/1978 Muhlfelder et al.
5,249,783 A   10/1993 Davis
5,820,079 A   10/1998 Harrell
6,003,849 A   12/1999 Davis et al.
6,039,290 A   3/2000 Wie et al.
6,305,647 B1  10/2001 Defendini et al.
6,340,137 B1  1/2002 Davis et al.
6,354,163 B1  3/2002 Heiberg

* cited by examiner

Primary Examiner—Robert P. Swiatek
(74) Attorney, Agent, or Firm—Ingrassia Fisher & Lorenz

(57) ABSTRACT

A momentum-control system comprising a plurality of momentum actuators and a platform upon which the plurality of momentum actuators are mounted. The momentum control system further comprises a plurality of active struts mounted on the bottom side of the platform. The active struts are configured to produce a force to steer the plurality of momentum actuators and the platform to produce forces and moments for spacecraft attitude control and disturbance suppression.

8 Claims, 3 Drawing Sheets

METHOD AND SYSTEM FOR STEERING A MOMENTUM CONTROL SYSTEM

FIELD OF THE INVENTION

This invention relates to the field of spacecraft vehicle control and, more specifically, to a method and system for steering a momentum control system.

BACKGROUND OF THE INVENTION

In order to control the attitude of a spacecraft, various rotating inertia members such as reaction wheel assemblies (RWAs), control momentum gyros (CMGs) and similar actuators are used.

Reaction wheels are typically flywheels that are fixed in the body frame. Torque can be produced by varying the spin rate of the flywheel. The torque produced is produced along the spin axis of the flywheel. A CMG comprises a flywheel with a fixed spin rate mounted to a gimbal assembly. The spin axis of the CMG can be changed by moving the CMG using the gimbal assembly. The torque produced is orthogonal to the spin axis and the gimbal axis. Typically, multiple actuators are oriented such that manipulation of each actuator causes movement about one of at most three linearly independent axes. Thus, control of all three attitude degrees of freedom requires at least three actuators, with extra actuators added to provide for failure robustness, to distribute control authority among the various attitude degrees of freedom, and to enable subtle steering laws. It is common practice to distribute the actuators remotely from each other, placing them wherever space permits. While distributing the actuators results in a system that generally applies the correct control torques, inefficiencies can result, including duplication of actuator electronics, mechanical structure, and vibration-isolation hardware among these remotely placed units.

To solve these problems, various momentum control systems (MCS) have been proposed. In one embodiment, the MCS comprises at least three actuators mounted together on a single mechanical pallet. A number of isolation struts, comprising the mechanical equivalent of one or two springs and a viscous damper, are coupled at one end to the pallet and at another end to the spacecraft (via, in most cases, a pivot with low rotational stiffness but high translational stiffness, such as a ball-in-socket joint or a blade flexure). The isolation system acts as a mechanical low-pass filter that transmits torque produced by manipulation of the actuators to the spacecraft while at the same time attenuating higher-frequency vibrations. Such an arrangement can be found in U.S. Pat. No. 6,340,137 entitled "Moment Control Unit for Spacecraft Attitude Control" and issued to Davis et al. on Jan. 22, 2002. This patent is hereby incorporated by reference.

Isolation struts can be either passive struts or active struts. Typical passive struts utilize a viscous fluid to help attenuate high-frequency vibrations. An exemplary passive strut is described in U.S. Pat. No. 5,249,783 issued to Davis on Oct. 5, 1993. This patent is hereby incorporated by reference.

Active struts are similar to passive struts but also include sensors and a prismatic actuator in parallel or in series with the passive elements. The actuator is typically a Lorenz force actuator, such as a voice coil, although any actuator can be used. Sensors are used to detect displacements, accelerations, loads or other parameters. The actuator, in response to the sensors or to external commands, applies forces to filter out or actively suppress these measured disturbances. Another actuator can be used to actively change the fluid pressure in the strut to enhance the vibration and shock dissipation. An exemplary active strut is described in U.S. Pat. No. 6,003,849 issued to Davis et al. on Dec. 21, 1999. This patent is hereby incorporated by reference.

In current momentum control systems (MCSs), the use of active struts is limited to filtering disturbances and to responding to the movement of the platform as caused by the movement of the CMGs or RWA. However, the struts can be used for more than merely reacting to these loads. Therefore, what is needed is a method and system for steering a momentum control system that takes full advantage of the functionality inherent in the active-strut design.

SUMMARY OF THE INVENTION

The present invention provides a steering law for a momentum control system. In one embodiment, and by way of example only, the momentum control system comprises a plurality of momentum actuators and a platform, upon which the plurality of momentum actuators are mounted. The momentum control system further comprises a plurality of active struts that mount the platform to the spacecraft structure. The active struts are configured to produce forces and moments to steer the plurality of momentum actuator and the platform.

In another embodiment, a method for providing additional torque and momentum from a momentum control system mounted in a spacecraft is provided. The momentum control system comprises a momentum actuator array that includes a platform having a top portion and a bottom portion. A plurality of momentum actuators are mounted on the top portion of the platform and a plurality of active struts are mounted on the bottom portion of the platform. The method comprises receiving a desired force, torque and/or momentum command to adjust the attitude of the spacecraft, calculating the forces necessary for each of the plurality of struts to exert on the momentum actuator array to produce the desired adjustment; simultaneously calculating the torque for each momentum actuator, and moving each of the plurality of struts and momentum actuators to produce the calculated force, thereby applying the desired force, torque, and/or momentum to the spacecraft.

Other independent features and advantages of the preferred embodiment will become apparent from the following detailed description, taken in conjunction with the accompanying drawings which illustrate, by way of example, the principles of the invention.

BRIEF DESCRIPTION OF THE DRAWINGS

The present invention will hereinafter be described in conjunction with the following drawing figures, wherein like numerals denote like elements, and.

DETAILED DESCRIPTION OF A PREFERRED EMBODIMENT

Active struts, as discussed above, can be used to provide enhanced damping and isolation capabilities over passive struts. This is accomplished by having the active struts react to movements in the MCS such as those caused by changing the speed of a reaction wheel or by the gimbaling of a CMG.

Figure 1:
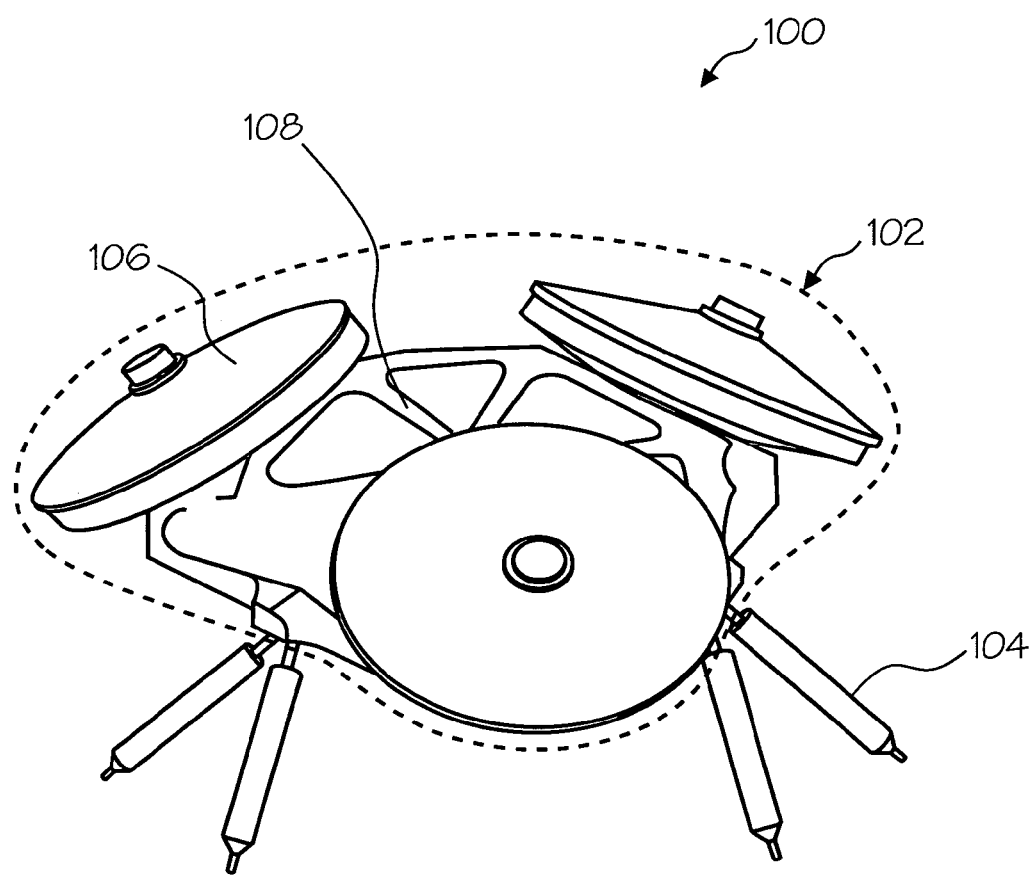
FIG. 1 illustrates an exemplary momentum control system.
Figure 2:
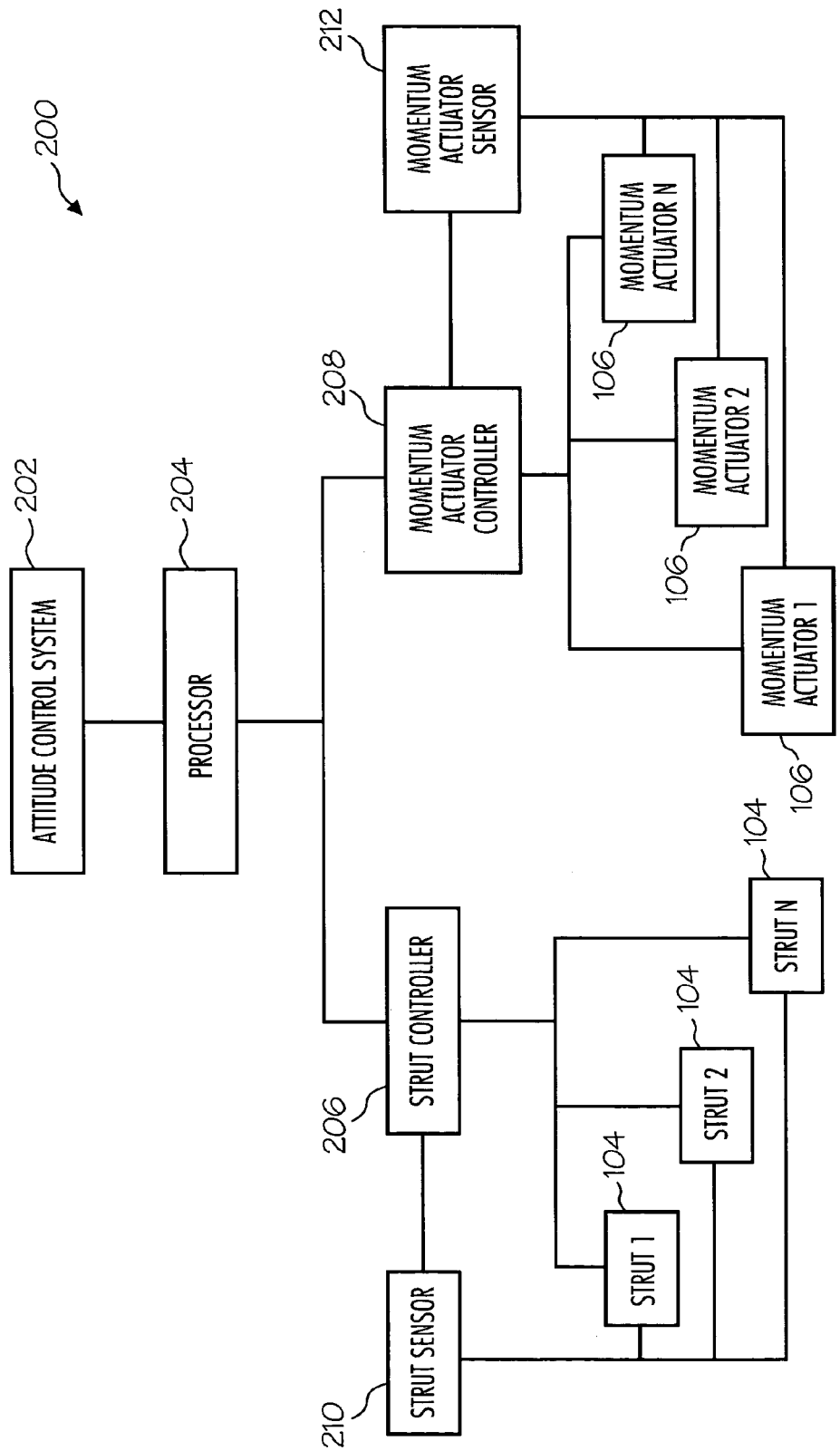
FIG. 2 is a block diagram illustrating a control system for an active strut.
Figure 3:
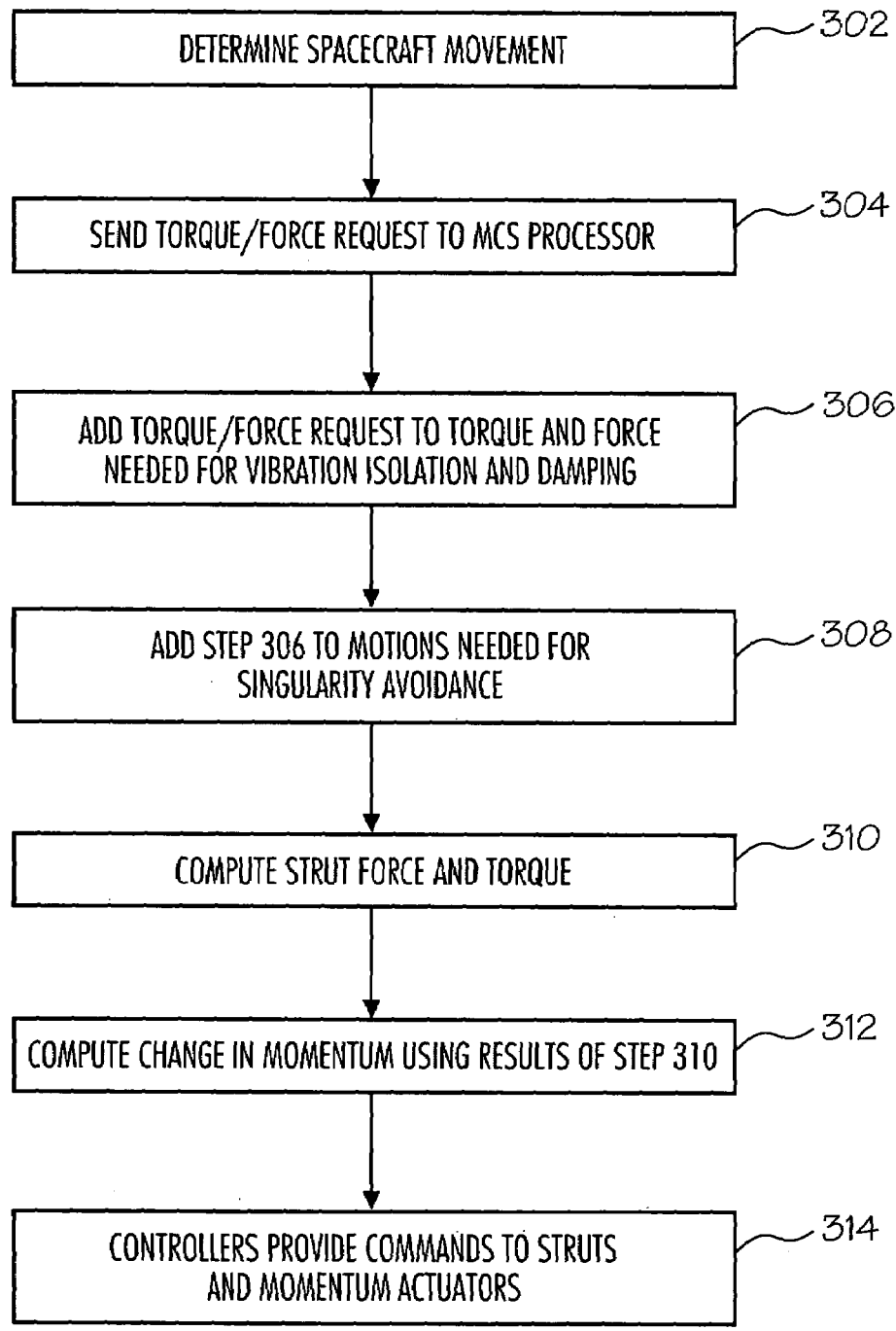
FIG. 3 is a flow chart illustrating a method for using the present invention.

In the present invention, advantages over previous systems are achieved by using the active struts to manipulate the entire momentum control system's rotational and translational position, rate, and acceleration. For example, FIGS. 1–3 illustrate an embodiment of the present invention. As illustrated in FIG. 1, an exemplary momentum control system (MCS) 100 comprises a momentum-actuator array 102 coupled to a plurality of struts 104. Momentum-actuator array 102 comprises, in the exemplary embodiment of FIG. 1, a plurality of momentum actuators 106 coupled to a platform 108.

The momentum actuators 106 store momentum and can be manipulated to produce a torque that can be used to adjust the attitude of the body in which the momentum control system is mounted (such as a spacecraft). In one embodiment, as shown in FIG. 1, the momentum actuators 106 are reaction wheels. However, the momentum actuators 106 can be any device capable of being manipulated to impart forces and moments to a spacecraft, including CMGs and momentum wheels. In FIG. 1, three momentum actuators 106 are illustrated. Three momentum actuators 106 provide the ability to change attitude of the spacecraft in all three axes. Additional momentum actuators 106 can be provided to provide for failure robustness, to distribute control authority among the various attitude degrees of freedom, and to enable subtle steering laws.

Platform 108 supports the momentum actuators 106. In one embodiment platform 108 is of the well-known Stewart-Gough platform design, although any suitable platform design can be used.

Active struts 104 mount to the platform 108 and attenuate and suppress vibrations in the momentum actuator array 102. As discussed previously, active struts 104 incorporates one or more actuators that can cause movement of the active strut. Typically the actuator causes the active strut to extend or contract along a longitudinal axis. The maximum extension of an active strut 104 is known as its stroke. While FIG. 1 illustrates all of the struts 104 on one side of the momentum actuator array 102, struts 104 can be distributed in any arrangement to provide damping and isolation.

In one embodiment, six active struts 104 are coupled to the momentum-actuator array 102. The active struts 104 provide damping and isolation in six degrees of freedom (three rotational and three translational). However, more or fewer active struts 104 can be used to provide additional isolation of the momentum actuator array 102. Additionally, passive struts can be used in conjunction with active struts 104 to provide additional isolation and damping capabilities.

In the present invention, the active struts 104 can be adjusted to move the momentum actuator array 102. By moving the momentum actuator array 102 along with or in place of actuating individual reaction wheels or CMGs, performance of the MCS 100 can be enhanced, as discussed in detail below.

In order to appreciate the advantages of moving the momentum actuator array 102 using active struts 104, an equation for control of a generalized MCS 100 that accounts for the use of the active struts 104 to move the MCS 100 needs to be developed.

The equation to be derived will be derived with linearizations and with the assumptions that the struts do not contribute any mass or inertia to the MCS 100, that the flexible modes of the MCS 100 palette are far above the break frequency of the isolation (making it appear rigid to the spacecraft), and that the actuators within the MCS 100 are statically balanced about whatever axes they spin. Other than those simplifications, the derived Jacobian, through which the spacecraft can request control outputs (i.e. MCS torques, forces, and momentum), will be complete. The derived equations offer the advantage that some normally neglected features of the MCS 100 dynamics can be identified and may be exploited.

To start the calculation, first, a set of orthonormal MCS-fixed basis vectors $m_i$ collected in a 1×3 vectrix m=[$m_1$ $m_2$ $m_3$] are defined. "MCS-fixed" means that these vectors are constant in a frame M associated with the MCS palette. In the following description, vector-dyadic notation is used, which eliminates the need for tracking the attitude of one coordinate system with respect to another. When the final results are implemented, the vectors and dyadics are expressed as matrices, and the matrix entries are subject to coordinate-system rotations.

An MCS, like the one shown FIG. 1, has a mass m and an inertia dyadic $I_m$ such that in the M frame $$I_m = m \begin{bmatrix} I_{11} & I_{12} & I_{13} \\ I_{12} & I_{22} & I_{23} \\ I_{13} & I_{23} & I_{33} \end{bmatrix} m^T, \tag{1}$$

where $I_{11}$, $I_{22}$, and $I_{33}$ are the principal moments of inertia for the MCS's mass center and $I_{12}$, $I_{13}$, and $I_{23}$ are its products of inertia. The spin speed of the $j^{th}$ wheel in the MCS is given in terms of the angular velocity vector of a wheel-fixed frame $W_j$ with respect to M. The angular velocity of the wheel with respect to an inertial frame N depends on the base. Accordingly, a frame B associated with the spacecraft body can be defined so that $\omega^{B/N}$ is the angular velocity of B in N (i.e. the inertial angular velocity of the spacecraft); $\omega^{M/B}$ is the angular velocity of M in B (i.e. the angular velocity of the MCS palette relative to the spacecraft); and $\omega^{W_j/M}$ is the angular velocity of frame $W_j$ in M (the angular velocity of each wheel as measured by the wheel tachometer).

In terms of $W_j$-fixed basis vectors w, which can be chosen as the principal axes of the symmetric wheel's inertia matrix, the $j^{th}$ wheel's inertia dyadic is:

$$I_j = w_j \begin{bmatrix} I_{j1} & 0 & 0 \\ 0 & I_{j1} & 0 \\ 0 & 0 & I_{j3} \end{bmatrix} w_j^T, \tag{2}$$

where $I_{j3}$ is the spin moment of inertia, and $I_{j1}$ is the transverse moment of inertia for any axis normal to $m_3$.

Having defined these angular velocities and inertia dyadics, an expression for the angular momentum, $H_c$, of the entire MCS about its own mass center can be expressed as:

$$H_c = I_m \cdot (\omega^{M/B} + \omega^{B/N}) + \sum_{j=1}^{n} I_j \cdot (\omega^{W_j/M} + \omega^{M/B} + \omega^{B/N}), \quad (3)$$

which accounts for the relative angular velocity of all of the rotating frames (M, B and N). The wheel inertias, which are fixed in M, can be combined with the MCS palette so that the wheel's angular velocity can be defined in terms of what a tachometer mounted on the wheel would measure:

$$H_c = \left(I_m + \sum_{j=1}^{n} I_j\right) \cdot (\omega^{M/B} + \omega^{B/N}) + \sum_{j=1}^{n} I_j \cdot \omega^{W_j/M}. \quad (4)$$

The first summation can be replaced with a single inertia dyadic, which includes all of the inertia that contributes to the MCS angular momentum via its angular velocity in B. The second summation can be replaced with a single momentum vector, h, the vector sum of all the wheels' contributions. The result is:

$$H_c = I \cdot (\omega^{M/B} + \omega^{B/N}) + h. \quad (5)$$

The movement of the MCS's mass participates in the dynamics of the spacecraft. In the following derivations, the vector c represents the location of the mass center of the MCS 100 relative to the spacecraft system mass center. Initially, it is assumed that the mass of the MCS 100 is small enough in relation to the entire system that the mass' motion contributes only negligibly to that of the spacecraft. In other words, it is assumed that the system mass center does not move as the struts move the MCS 100.

Arriving at an expression for the force and torque available from MCS motion requires the time derivative of c in N, which is written formally as $$\frac{^N d c}{d t}.$$

From kinematics, $$\frac{^N d c}{d t} = \frac{^B d c}{d t} + \omega^{B/N} \times c \quad (6)$$

The second derivative of c in N is:

$$\frac{^N d}{d t}\left(\frac{^N d c}{d t}\right) = \quad (7)$$
$$\frac{^B d}{d t}\left(\frac{^B d c}{d t}\right) + \frac{^B d \omega^{B/N}}{d t} \times c + \omega^{B/N} \times \frac{^B d c}{d t} + \omega^{B/N} \times \left(\frac{^B d c}{d t} + \omega^{B/N} \times c\right)$$

For simplicity, the notation $$\overset{N}{c}$$

can be substituted for $$\frac{^N d c}{d t}, \text{ and } \overset{NN}{c}$$

can be substituted for $$\frac{^N d}{d t}\left(\frac{^N d c}{d t}\right).$$

Then, the expression above becomes $$\overset{NN}{c} = \overset{BB}{c} + \overset{B/N}{\omega}^{B/N} \times c \times \omega^{B/N} \times \overset{B}{c} + \omega^{B/N} \times \left(\overset{B}{c} + \omega^{B/N} \times c\right), \quad (8)$$

which then simplifies to an expression involving tangential, centripetal, and coriolis acceleration:

$$\overset{NN}{c} = \overset{BB}{c} + \overset{B/N}{\omega}^{B/N} \times c + 2\omega^{B/N} \times \overset{B}{c} + \omega^{B/N} \times (\omega^{B/N} \times c), \quad (9)$$

The translational momentum, L, of the MCS 100 can be expressed as:

$$L = m\left(\overset{B}{c} + \omega^{B/N} \times c\right). \quad (10)$$

The moment of this momentum, $H_m$, about the spacecraft system mass center (i.e. the MCS's 100 angular momentum due to its mass motion) is:

$$H_m = c \times L = mc \times \left(\overset{B}{c} + \omega^{B/N} \times c\right), \quad (11)$$

The total angular momentum, H, for the MCS 100 about the spacecraft mass center can be expressed as:

$$H = H_m + H_c, \text{ or} \quad (12)$$

$$H = mc \times \left(\overset{B}{c} + \omega^{B/N} \times c\right) + I \cdot (\omega^{M/B} + \omega^{B/N}) + h \quad (13)$$

If no external torques act on the spacecraft/MCS system, the sum of the two subsystems' angular momentum is conserved. That is, the torques and forces at the interface between the MCS 100 and the spacecraft results in equal and opposite torques and forces on each subsystem. The interface torque acting on the MCS 100 is the time derivative of the angular momentum in the MCS, $\overset{N}{\dot{H}}$:

$$\overset{N}{\dot{H}} = \frac{{}^M d}{dt}\left(mc \times \left(\overset{B}{\dot{c}} + \omega^{B/N} \times c\right) + I \cdot (\omega^{M/B} + \omega^{B/N}) + h\right) + \qquad (14)$$
$$(\omega^{M/B} + \omega^{B/N}) \times \left(mc \times \left(\overset{B}{\dot{c}} + \omega^{B/N} \times c\right) + I \cdot (\omega^{M/B} + \omega^{B/N}) + h\right),$$

which expands to:

$$\overset{N}{\dot{H}} = m\overset{M}{\dot{c}} \times \left(\overset{B}{\dot{c}} + \omega^{B/N} \times c\right) + \qquad (15)$$
$$mc \times \left(\overset{MM}{\ddot{c}} + \left(\overset{M}{\dot{\omega}}{}^{M/B} + \overset{M}{\dot{\omega}}{}^{B/N}\right) \times c + (\omega^{M/B} + \omega^{B/N}) \times \overset{M}{\dot{c}}\right) +$$
$$I \cdot \left(\overset{M}{\dot{\omega}}{}^{M/B} + \overset{M}{\dot{\omega}}{}^{B/N}\right) + \overset{M}{\dot{h}} +$$
$$(\omega^{M/B} + \omega^{B/N}) \times \left(mc \times \left(\overset{B}{\dot{c}} + \omega^{B/N} \times c\right) + I \cdot (\omega^{M/B} + \omega^{B/N}) + h\right).$$

Kinematic identities can be used to simplify the above expression (equation 15) further. In particular, the derivatives in B are eliminated via $$\overset{B}{\dot{c}} = \overset{M}{\dot{c}} + \omega^{M/B} \times c: \qquad (16)$$

$$\overset{N}{\dot{H}} = m\overset{M}{\dot{c}} \times \left(\overset{M}{\dot{c}} + (\omega^{M/B} + \omega^{B/N}) \times c\right) +$$
$$mc \times \begin{pmatrix} \overset{MM}{\ddot{c}} + \left(\overset{M}{\dot{\omega}}{}^{M/B} + \overset{M}{\dot{\omega}}{}^{B/N}\right) \times c + \\ (\omega^{M/B} + \omega^{B/N}) \times \overset{M}{\dot{c}} \end{pmatrix} +$$
$$I \cdot \left(\overset{M}{\dot{\omega}}{}^{M/B} + \overset{M}{\dot{\omega}}{}^{B/N}\right) + \overset{M}{\dot{h}} +$$
$$(\omega^{M/B} + \omega^{B/N}) \times \begin{pmatrix} mc \times \\ \left(\overset{M}{\dot{c}} + (\omega^{M/B} + \omega^{B/N}) \times c\right) + \\ I \cdot (\omega^{M/B} + \omega^{B/N}) + h \end{pmatrix}.$$

Because this expression already includes the influence of the MCS's mass motion, it implicitly includes the effect of the interface force acting about the mass center as a torque. The interface force itself, $$\overset{N}{L},$$

is:

$$\overset{N}{L} = m\overset{NN}{\ddot{c}}. \qquad (17)$$

or $$\overset{N}{L} = m\left(\overset{BB}{\ddot{c}} + \overset{B}{\dot{\omega}}{}^{B/N} \times c + 2\omega^{B/N} \times \overset{B}{\dot{c}} + \omega^{B/N} \times \left(\omega^{B/N} \times c\right)\right). \qquad (18)$$

which, in terms of M-frame derivatives, is $$\overset{N}{L} = m\left(\left(\overset{MM}{\ddot{c}} + \overset{M}{\dot{\omega}}{}^{M/B} \times c + 2\omega^{M/B} \times \overset{M}{\dot{c}} + \omega^{M/B} \times (\omega^{M/B} \times c)\right) + \qquad (19)$$
$$\left(\overset{M}{\dot{\omega}}{}^{B/N} + \omega^{M/B} \times \omega^{B/N}\right) \times c + 2\omega^{B/N} \times \left(\overset{M}{\dot{c}} + \omega^{M/B} \times c\right) +$$
$$\omega^{B/N} \times (\omega^{B/N} \times c)).$$

Simplified, this expression becomes $$\overset{N}{L} = m\begin{pmatrix} \overset{MM}{\ddot{c}} + \left(\overset{M}{\dot{\omega}}{}^{M/B} + \overset{M}{\dot{\omega}}{}^{B/N}\right) \times c + (2\omega^{M/B} + 2\omega^{B/N}) \times \overset{M}{\dot{c}} + \\ (\omega^{M/B} + \omega^{B/N}) \times ((\omega^{M/B} + \omega^{B/N}) \times c) \end{pmatrix} \qquad (20)$$

These results describe the force, $$\overset{N}{L},$$

and the torque, $$\overset{N}{\dot{H}},$$

that act on the MCS 100. Because the force and torque on the spacecraft must be equal and opposite (momentum is conserved), the output of the MCS 100 as an actuator is $$-\overset{N}{L} \text{ and } -\overset{N}{\dot{H}}.$$

With these expressions for the force and torque available from the MCS 100, expressions to be used in spacecraft actuation can be determined. Specifically, these expressions include Jacobians, or matrices of influence coefficients, that map the actuator degrees of freedom into the output desired. In general these Jacobians are functions of the states and the system parameters, making the control problem fundamentally nonlinear (as is the case of CMG array control).

At least two means are available to alter the state of the MCS 100 as shown in FIG. 1. In prior art devices, varying the wheel speed of a reaction wheel or the gimbal angle of a CMG could alter the state of the MCS 100. In the present invention, MCS 100 control can also be done directly through the struts 104. The struts 104 are actuated to produce the desired force and moment at the spacecraft mass center, and the MCS 100 itself is commanded to follow up via feed forwarding the strut movement.

While platforms typically utilize six single-DOF struts 104, in the following derivation, an equation for a system utilizing n struts will be derived. By deriving an equation for n struts 404, possible application to future, more complex systems can be found. Each strut 104 is assumed to apply a force and torque that is linearly independent of the others (for example, for configurations that include up to six struts all six components linearly independent). In this analysis, each $r_j$ is the vector from the mass center of the gimbal assembly to the attachment point of the jth strut. $\hat{x}_j$ is the unit vector along which the $j^{th}$ strut applies a scalar force $f_j$.

Therefore, the force F acting at the strut/gimbal interface at body 1 (the innermost gimbal) is $$F = f_1 \hat{x}_1 + f_2 \hat{x}_2 + \ldots + f_n \hat{x}_n, \quad (21)$$

and the torque M about the gimbal system mass center is $$M = f_1 r_1 \times \hat{x}_1 + f_2 r_2 \times \hat{x}_2 + \ldots + f_n r_n \times \hat{x}_n. \quad (22)$$

In terms of the $m_i$ basis vectors, these equations can be written in the following matrix form:

$$\begin{bmatrix} F \\ M \end{bmatrix} = J \begin{bmatrix} f_1 \\ f_2 \\ \vdots \\ f_n \end{bmatrix}, \quad (23)$$

where J is a 6×n Jacobian that depends on the strut geometry:

$$J = \begin{bmatrix} J_F \\ J_M \end{bmatrix} = \begin{bmatrix} \hat{x}_1 & \hat{x}_2 & \ldots & \hat{x}_n \\ r_1^x \hat{x}_1 & r_2^x \hat{x}_2 & \ldots & r_n^x \hat{x}_n \end{bmatrix}. \quad (24)$$

The force, $$-\overset{N}{L},$$

and torque, $$-\overset{N}{H},$$

on the spacecraft were previously calculated. Achieving a commanded force and torque requires a pseudoinverse of this matrix (equation 23), so that $$\begin{bmatrix} f_1 \\ f_2 \\ \vdots \\ f_n \end{bmatrix} = J^+ \begin{bmatrix} F \\ M \end{bmatrix} \quad (25)$$

If the struts are guaranteed to be nonsingular, the well-known Moore-Penrose pseudoinverse may be used:

$$J^+ = J^T (JJ^T)^{-1}. \quad (26)$$

If there is a risk of singularities, i.e. if it is possible the Jacobian will have either more columns than rows or more rows than columns, the inversion can not be guaranteed to be nonsingular. However, if a small nonzero term, $\epsilon I$, is added to the Jacobian inverse equation, any singularities can be avoided at the expense of small force and torque errors:

$$J^+ \approx J^T (JJ^T + \epsilon I)^{-1}. \quad (27)$$

Since $JJ^T$ is never negative, the determinant of $(JJ^T + \epsilon I)$ is never zero. An alternative approach, which introduces no errors, is to use the degrees of freedom in the null space of the Jacobian, J, to steer the system away from singularities without sacrificing accuracy in the commanded force and torque. Here, null space refers to the complementary subspace to J. Any commands that lie entirely in the null space can be applied without producing physical forces and torques. Such commands can be used to move actuators toward a nonsingular configuration without perturbing the output.

The momentum actuators within the MCS 100 and the MCS mass and inertia provide a physical system against which the struts 104 can react. Thus, the wheels do not directly steer the spacecraft; the struts 104 do, but the wheels and the MCS body absorb the struts' 104 applied forces and torques. This scheme is analogous to how a spacecraft unloads momentum by using thrusters (a set of applied external forces) to establish a desired momentum, torque, and/or force state, and the wheels maintain attitude control via a combination of feedforward of the applied torques and feedback of small attitude and rate errors. In the case of the MCS 100, gap sensors and load cells are used to generate an error signal for the wheels or gimbals of the momentum actuator to follow.

When the MCS 100 is requested to apply F and M, the reaction is fed forward to the wheels (assuming in this case the momentum activator is are reaction wheels) such that $$\begin{bmatrix} -\overset{N}{L} \\ -\overset{N}{H} \end{bmatrix} = \begin{bmatrix} m_1 & m_2 & m_3 & 0 \\ 0 & & m_1 & m_2 & m_3 \end{bmatrix} J \begin{bmatrix} f_1 \\ f_2 \\ \vdots \\ f_n \end{bmatrix}, \quad (28)$$

where the M axes have been introduced because the left-hand side is a vector expression, in which the attitude of the M axes is implicit.

Direct control over the wheel torques $$\overset{M}{(h)}$$

is assumed to be available to the MCS 100, and the necessary wheel torque is:

$$\overset{M}{h} = -[m_1 \ m_2 \ m_3] J_M \begin{bmatrix} f_1 \\ f_2 \\ \vdots \\ f_n \end{bmatrix} - \left( m \overset{M}{c} \times \left( \overset{M}{c} + (\omega^{M/B} + \omega^{B/N}) \times c \right) + \right.$$

$$mc \times \left( \overset{MM}{c} + \left( \overset{M}{\omega}^{M/B} + \overset{M}{\omega}^{B/N} \right) \times c + (\omega^{M/B} + \omega^{B/N}) \times \overset{M}{c} \right) +$$

$$I \cdot \left( \overset{M}{\omega}^{M/B} + \overset{M}{\omega}^{B/N} \right) + (\omega^{M/B} + \omega^{B/N}) \times$$

$$\left. \left( mc \times \left( \overset{M}{c} + (\omega^{M/B} + \omega^{B/N}) \times c \right) + I \cdot (\omega^{M/B} + \omega^{B/N}) + h \right) \right), \quad (29)$$

where only the 3×n partition of J corresponding to the moments is included. If there were explicit force actuators inside the MCS 100, their accelerations would be commanded similarly. Since they are unavailable, the MCS's force capability saturates whenever the struts 104 exceed their stroke. In the case of reaction wheels, the wheel torques are commanded the traditional way, through a matrix A that maps their spin axes into the coordinate system of interest. So, a 3×1 matrix version of the vector torque, ħ, would be achieved through $$h = A \begin{bmatrix} h_1 \\ h_2 \\ \vdots \\ h_n \end{bmatrix}, \quad (30)$$

where the n×1 vector includes individual wheel momentum and A contains the wheel spin-axis unit vectors, $s_i$:

$$A = [s_1 s_2 \ldots s_n]. \quad (31)$$

Typically a pseudoinverse is used to command each wheel:

$$\begin{bmatrix} h_1 \\ h_2 \\ \vdots \\ h_n \end{bmatrix} = A^+ h. \quad (32)$$

This general result for $$\overset{M}{h}$$

includes terms not usually included in the calculation of, $$\overset{M}{h},$$

but may be important for high-precision applications, or applications where the active strut's capability introduces significant angular velocity and/or acceleration into the MCS palette. For example, if the struts' stroke is short such that the palette develops only insignificant translational and angular velocity, the expression for $$\overset{M}{h}$$

becomes:

$$\overset{M}{h} = -[m_2 \ m_2 \ m_3] J_M \begin{bmatrix} f_1 \\ f_2 \\ \vdots \\ f_n \end{bmatrix} - \left( \begin{array}{l} mc \times \left( \overset{MM}{c} + \left( \overset{M/B}{\omega} + \overset{M B/N}{\omega} \right) \times c \right) + \\ I \cdot \left( \overset{M/B}{\omega} + \overset{M B/N}{\omega} \right) + \omega^{B/N} \times (mc \times (\omega^{B/N} \times c) + I \cdot \omega^{B/N} + h)) \end{array} \right), \quad (33)$$

In the case of CMGs, the matrix A includes output-axis torque directions, which vary with gimbal angle.

If the additional constraint of prohibiting the MCS's mass center from never translating (for example because the struts are controlled to not cause translation or because only rotational motion is provided via gimbals or a tip/tilt platform), then the equation for $$\overset{M}{h}$$

becomes:

$$\overset{M}{h} = -[m_1 \ m_2 \ m_3] J_M \begin{bmatrix} f_1 \\ f_2 \\ \vdots \\ f_n \end{bmatrix} - \quad (34)$$

$$I \cdot \left( \overset{M/B}{\omega} + \overset{MB/N}{\omega} \right) - \omega^{B/N} \times (I \cdot \omega^{B/N} + h)).$$

In the above equation only the base rate ($\omega^{B/N}$) is considered explicitly. Terms in $$I \cdot \overset{MB/N}{\omega} + \omega^{B/N} \times (I \cdot \omega^{B/N})$$

can be grouped with the spacecraft inertia as part of the constant, rigid-body mass properties. This, however, leaves terms $$I \cdot \overset{MM/B}{\omega} + \omega^{B/N} \times h$$

as a potential source of added momentum and torque. If the struts 104 are fed forward the MCS torques, as is typically done, the complete result is simply $$\overset{M}{h}$$

inverted:

$$\begin{bmatrix} f_1 \\ f_2 \\ \vdots \\ f_n \end{bmatrix} = \quad (35)$$

$$(-[m_1 \ m_2 \ m_3] J_M)^+ (\overset{M}{h} + (m\overset{M}{c} \times (\overset{M}{c} + (\omega^{M/B} + \omega^{B/N}) \times c) + mc \times$$
$$(\overset{MM}{c} + (\overset{M/B}{\omega} + \overset{MB/N}{\omega}) \times c + (\omega^{M/B} + \omega^{B/N}) \times \overset{M}{c}) +$$
$$I \cdot (\overset{M/B}{\omega} + \overset{MB/N}{\omega}) + (\omega^{M/B} + \omega^{B/N}) \times$$
$$(mc \times (\overset{M}{c} + (\omega^{M/B} + \omega^{B/N}) \times c) + I \cdot (\omega^{M/B} + \omega^{B/N}) + h))),$$

The strut forces computed this way would be added via feed forward to whatever other suppression or steering from the struts are commanded. Terms in these equations, which are typically ignored, can be exploited to increase the capability of the MCS 100. Possible uses include extending the momentum and torque envelope; providing new methods for singularity avoidance, and actuating the MCS 100 system to actively suppress vibrations elsewhere on the spacecraft.

The above equations show that by using the struts 104 to move the MCS 100, additional torque or momentum may be gained. One advantage of using the struts to move the MCS 100 is that additional torque, above what the MCS 100 itself could generate, can be generated. Torque can be generated when the struts are used to tilt the MCS 100 when the MCS wheels are storing momentum. When tilting a MCS 100, knowledge of the momentum direction is important. Thus, a biased momentum with some significant component orthogonal to the direction of the required torque can be used. Then, the struts 104 can move the MCS 100 to produce an output torque. For example, in the case where the spacecraft requires considerable, repeated roll torque, an MCS momentum bias in pitch can be established and a yaw rate commanded to the MCS platform via the struts 104 to impart this roll torque as a gyroscopic effect.

One use for the torque produced by steering the MCS 100 with struts 104 is to counteract disturbance torques such as thermal-snap torques. Thermal snap is the distortion undergone in flexible bodies when they are suddenly exposed to heat or cold—such as when a spacecraft enters or leaves Earth eclipse. The disturbance is not an external torque, and so there is no permanent change in the angular momentum. However, the spacecraft's central body (the bus) can tilt relative to the solar array, for example, due to this motion; and because the payload tends to follow the bus motion, the disturbance affects pointing performance of the spacecraft. The torques occur over a time period of minutes, generally exciting the first bending modes of the spacecraft. The thermal-snap torque can be countered by torque produced by titling the MCS 100. The short duration of the thermal snap, the fact that the torques are internal for the thermal snap, and the high amplitude, low-displacement nature of the torques produced by the thermal snap fit well with the torque generating capability of a steerable MCS. Furthermore, in the case of geostationary spacecrafts with large solar arrays, maintaining the required momentum bias along the spacecraft pitch (or north) direction can improve the stability of the system, so the presence of this bias is not necessarily a detriment.

The use of the struts 104 to move (steer) the MCS 100 can also increase the available momentum. In prior art systems, the only momentum term considered was h, the sum of the wheel angular momentum as computed from tachometer measurements. However, in the present invention, other terms can be used as well to enhance the available momentum.

One term that can be used to enhance available angular momentum represents the angular momentum of the MCS 100 due to palette rotation ($\omega^{M/B}$) and due to spacecraft base rate ($\omega^{B/N}$): $I \cdot (\omega^{M/B} + \omega^{B/N})$. Palette rotation can be achieved by using the struts to tilt the MCS 100. The spacecraft base rate is not normally considered available for actuation, but some cooperative form of control, one that considers both the MCS 100 and the spacecraft as part of a larger system, can be devised that includes base rate as a means of adjusting MCS 100 momentum. Even if the base-rate effect is absent, the angular momentum of the MCS 100 due to palette rotation ($\omega^{M/B}$) is still available.

Another term that can be used to enhance available momentum represents the angular momentum of the MCS's mass as its mass center travels a path that does not coincide with the spacecraft system mass center:

$$mc \times (\overset{B}{\dot{c}} + \omega^{B/N} \times c).$$

The ability to have the MCS mass travel a path outside the spacecraft's system mass center is short-lived, as the strut actuators are stroke-limited in their attempt to achieve a palette velocity. The movement of the MCS's mass center can also be used to counteract the motion of other bodies, such as solar arrays, that temporarily store and output translational momentum during flexible motions by using MCS mass as a proof-mass actuator and moving the MCS mass in response to external forces.

Another term that can be used to enhance available momentum represents translational momentum of the MCS's mass:

$$m(\overset{B}{\dot{c}} + \omega^{B/N} \times c).$$

As is the case for the angular momentum due to this effect, this capability would be short-lived as the struts 104 would reach their maximum stroke quickly. However, the MCS mass can be used as a proof-mass actuator or a tuned-mass damper, and the translation momentum can also be used to counteract the motion of other bodies, such as solar arrays, that temporarily store and output translational momentum during flexible motions. The translation momentum of the MCS's mass can also be used to translate the spacecraft relative to a desired celestial or terrestrial target if the payload pointing requirements include translational degrees of freedom. Traditionally, translational actuators are almost never included on spacecraft. Since simply moving the MCS mass with the existing struts offers translational actuation, this desirable functionality can be added without additional hardware cost.

Another additional benefit to using the struts to move (steer) the MCS 100 is that singularities that may occur in the movement of the momentum actuators 106 can be avoided. This problem is one that arises when CMGs are used in the MCS 100. Virtually any additional actuation capability can be used for singularity avoidance. In the present invention, as the singular configuration is approached, actively steering the MCS 100 to a different orientation offers additional angular displacements to allow momentum and torque to be achieved with different CMG gimbal-angle sets. The Jacobian for MCS torque output, J, now includes strut forces along with the CMG gimbals, so that the mathematical singularities among gimbal angles no longer introduce singularity in the momentum-actuator Jacobian A.

Saturation singularities might be avoided, at least temporarily, in a similar fashion. Saturation singularities are singularities in the momentum envelope of the MCS. Sometimes they are known as "strongly blocking" singularities. For example, in a CMG the momentum envelope includes "lilypad" shaped areas of saturation singularities near the CMG gimbal axes. By tilting the MCS 100 so that the lilypad is kept away from the desired momentum vector in spacecraft body axes, the available momentum can be extended. The lilypad remains in MCS 100 axes, but those axes shift due to MCS tilting so that the lilypad is never encountered in spacecraft axes.

An exemplary control system and method of steering the MCS 100 using the struts is shown in FIGS. 2–3.

FIG. 2 is a block diagram of an exemplary control system 200 for a MCS 100. The components of the control system are known in the art and can be assembled in different ways using different processors, software, controllers, sensors and the like. The control system 200 includes an attitude control system 202 coupled to a MCS control processor 204. The MCS controllers are coupled to one or more strut controllers 206 and one or more momentum actuator controllers 208. The strut controllers 206 are coupled to the struts 104 and the momentum actuator controllers 208 are coupled to the momentum actuators 106. Strut sensors 210 and momentum actuator sensors 212 provide feedback on the state of the struts 104 and momentum actuators 106.

Attitude control system 202 controls the positioning of the spacecraft. The MCS control processor 204 receives angular momentum, torque, translational momentum, and force commands for the attitude control systems and calculates the force needed for each strut to exert to produce the designed torque and/or force calculated by the MCS control processor 204. The strut forces are used to apply the change in momentum necessary for the required maneuver.

Strut controller 206 receives the commands necessary to cause the change in the force and causes the struts 104 to make the desired movements. Momentum actuator controller 208 receives commands necessary to make the change in momentum in the momentum actuators 106, such as by changing the speed of a reaction wheel or the angle of a gimbal.

Strut sensors 210 are any sensors that gather data necessary for the measurement and actuation of the struts 104. These can include gap sensors, which measure strut extension. Momentum-actuator sensors 112 are any sensors necessary to provide monitoring and control of the momentum actuator 106, such as a tachometer to measure the spin rate of a reaction wheel or a CMG's gimbal.

FIG. 3 is a flowchart illustrating an exemplary use of the present invention. In a first step 302, the attitude control system determines a spacecraft maneuver or a desired torque or force for vibration cancellation. Next, in step 304 a torque and force request to perform the maneuver is sent to the MCS processor 204, which is running MCS control software. The torque and force request are then added with torque and force necessary for vibration isolation and damping by the struts 104 for six degrees of freedom in step 306. Then, optionally, in step 308, the sum from step 306 is added to any motion necessary to implement a singularity avoidance algorithm. The momentum of the struts and/or momentum actuators are computed to best avoid singularity taking into consideration strut stroke limits and gimbal limits for CMGs.

Once all of these torques (Ad) and/or forces (F) are calculated, in step 310 the MCS software computes the force, $f_i$, for each strut 104 via the previously discussed formula:

$$\begin{bmatrix} f_1 \\ f_2 \\ \vdots \\ f_n \end{bmatrix} = J^+ \begin{bmatrix} F \\ M \end{bmatrix}$$

Then, in step 312, using the forces for the struts 104 calculated in step 310, the change in momentum needed for the momentum actuators 106 is calculated using:

$$\overset{M}{h} = -[m_1 \ m_2 \ m_3]J_M \begin{bmatrix} f_1 \\ f_2 \\ \vdots \\ f_n \end{bmatrix} - \left(mc \times \left(\omega_c^{MM} + \left(\omega^{M/B} + \omega^{B/N}\right) \times c\right) + I \cdot \left(\omega^{M/B} + \omega^{B/N}\right) + \omega^{B/N} \times (mc \times (\omega^{B/N} \times c) + I \cdot \omega^{B/N} + h)\right)$$

Finally, in step 314, the MCS processor commands the struts and momentum actuators 106, via the strut controller 206 and momentum actuator controller 208, to apply the calculated force, torque and momentum change.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A momentum control system for a spacecraft comprising:
    a momentum actuator array comprising:
        a platform; and
        a plurality of momentum actuators mounted on the platform; and
    a plurality of active struts coupled to the platform, each of the plurality of active struts configured to attenuate and suppress vibrations in the momentum actuator array, the plurality of active struts further configured to produce a force on the platform to steer the momentum actuator array.

2. The system of claim 1 wherein the plurality of momentum actuators are reaction wheels.

3. The system of claim 1 wherein the plurality of momentum actuators are CMGs.

4. The system of claim 1 wherein the momentum actuators are operable to apply a torque to alter an orientation of the spacecraft, the torque calculated using the force produced by the struts as a component of the calculation.

5. The system of claim 3 wherein the active struts are operable to produce a force to steer the momentum actuator array such that a torque is produced to avoid singularities in gimbal angle sets of the CMGs.

6. The system of claim 1 wherein the active struts are operable to produce a force to steer the momentum actuator array such that a torque is produced to compensate for disturbance torques in the spacecraft.

7. The system of claim 1 wherein the active struts are operable to produce a force to steer the momentum actuator array such that the momentum actuator array acts as a proof-mass.

8. The system of claim 1 wherein the platform is a Stewart-Gough platform.

* * * * *